(12) United States Patent
Witte-Merl et al.

(10) Patent No.: US 8,484,950 B2
(45) Date of Patent: Jul. 16, 2013

(54) EXHAUST GAS PURIFICATION CONFIGURATION AND METHOD FOR EXHAUST GAS PURIFICATION USING A REACTANT

(75) Inventors: Olaf Witte-Merl, Weilerswist (DE); Jan Hodgson, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 197 days.

(21) Appl. No.: 13/070,650

(22) Filed: Mar. 24, 2011

(65) Prior Publication Data

US 2011/0225952 A1    Sep. 22, 2011

Related U.S. Application Data

(63) Continuation of application No. PCT/EP2009/061543, filed on Sep. 7, 2009.

(30) Foreign Application Priority Data

Sep. 24, 2008 (DE) .......................... 10 2008 048 806

(51) Int. Cl.
*F01N 3/00* (2006.01)

(52) U.S. Cl.
USPC .................... 60/286; 60/274; 60/295; 60/303

(58) Field of Classification Search
USPC ............................ 60/274, 286, 295, 299, 303
See application file for complete search history.

(56) References Cited

U.S. PATENT DOCUMENTS

| | | | |
|---|---|---|---|
| 6,513,323 B1 * | 2/2003 | Weigl et al. ...................... 60/286 |
| 7,849,676 B2 | 12/2010 | Witte-Merl | |
| 2003/0108457 A1 | 6/2003 | Gault et al. | |
| 2007/0035832 A1 | 2/2007 | Hirata et al. | |
| 2007/0036694 A1 | 2/2007 | Nishioka et al. | |

FOREIGN PATENT DOCUMENTS

| | | | |
|---|---|---|---|
| DE | 102006038904 A1 | | 2/2008 |
| DE | 10 2006 051 788 A1 | | 5/2008 |
| DE | 102006051788 | * | 5/2008 |
| DE | 102006059507 A1 | | 6/2008 |
| EP | 1 890 016 A2 | | 2/2008 |

OTHER PUBLICATIONS

International Search Report of PCT/EP2009/061543, Dated Oct. 29, 2009.

* cited by examiner

*Primary Examiner* — Thomas Denion
*Assistant Examiner* — Diem Tran
(74) *Attorney, Agent, or Firm* — Laurence A. Greenberg; Werner H. Stemer; Ralph E. Locher

(57) ABSTRACT

A configuration for purification of an exhaust gas flow of an internal combustion engine includes at least one exhaust gas line having an element for exhaust gas purification with a first end face and a second end face. The exhaust gas flows through the element from the first end face to the second end face. An adding device is provided downstream of the element for adding a reactant to the exhaust gas flow. The adding device is positioned at a distance of no more than 30 mm from the second end face of the element in such a way that at least part of the added reactant strikes the second end face of the element. A method for adding a reactant into an exhaust line during the operation of an internal combustion engine is also provided.

13 Claims, 3 Drawing Sheets

EXHAUST GAS PURIFICATION CONFIGURATION AND METHOD FOR EXHAUST GAS PURIFICATION USING A REACTANT

CROSS-REFERENCE TO RELATED APPLICATION

This is a continuation, under 35 U.S.C. §120, of copending International Application No. PCT/EP2009/061543, filed Sep. 7, 2009, which designated the United States; this application also claims the priority, under 35 U.S.C. §119, of German Patent Application DE 10 2008 048 806.2, filed Sep. 24, 2008; the prior applications are herewith incorporated by reference in their entirety.

BACKGROUND OF THE INVENTION

Field of the Invention

The present invention relates to a configuration and a method for the purification of an exhaust-gas flow of an internal combustion engine, in which a reactant is sprayed onto an outflow side of an element for exhaust-gas purification.

In modern conventional systems for the exhaust-gas purification or cleaning of internal combustion engines, in particular of diesel engines, elements for exhaust-gas purification are inserted into exhaust lines. Those elements at least intermittently require the supply of a reactant for correct operation. The elements include, in particular, SCR catalytic converters, to which ammonia in pure or compound form, for example a urea solution, is supplied as a reducing agent for the selective reduction of nitrogen oxides. Furthermore, such elements also include oxidation-catalytic exhaust-gas purification elements to which hydrocarbon compounds (fuel) are supplied as a reactant for the purpose of exhaust-gas heating. The heating of the exhaust-gas flow is provided during a thermal soot regeneration of a particle filter or for sulfur regeneration of nitrogen oxide storage catalytic converters.

In order to provide highly effective exhaust-gas purification, it is sought to attain as uniform a distribution and as fine an atomization of the reactant over the cross section of the exhaust line as possible.

By adding the reactant in a direction counter to the exhaust-gas flow, a finer and better distribution of the reactant is attained as a result of the higher relative speed of the reactant in relation to the exhaust-gas flow. That effect is additionally assisted by the impingement of the reactant on the outflow side of the element for exhaust-gas purification, because the impinging droplets of the reactant are additionally atomized or can evaporate from the surfaces of the element directly into the exhaust-gas flow.

SUMMARY OF THE INVENTION

It is accordingly an object of the invention to provide an exhaust gas purification configuration and a method for exhaust gas purification using a reactant, which overcome the hereinafter-mentioned disadvantages and at least partially solve the highlighted problems of the heretofore-known configurations and methods of this general type and which, in particular, specify a configuration and a method through the use of which as uniform as possible a distribution of the reactant in the exhaust-gas flow is attained in order to thereby improve the evaporation of the reactant.

With the foregoing and other objects in view there is provided, in accordance with the invention, a configuration for the purification of an exhaust-gas flow of an internal combustion engine. The configuration comprises an exhaust line communicating with the internal combustion engine. An exhaust-gas purification element is disposed in the exhaust line and has a first end side and a second end side. The element is configured to conduct an exhaust-gas flow through the element from the first end side to the second end side. An adding unit is disposed downstream of the element for adding a reactant into the exhaust-gas flow. The adding unit is spaced apart from the second end side of the element by a distance of at most 30 mm, for causing at least a part of the added reactant to impinge on the second end side of the element.

An element for exhaust-gas purification is to be understood, in particular, to mean a catalyst carrier body which includes a catalytically active coating (in particular in a washcoat) which effects a conversion of at least one component of the reactant and/or of the exhaust gas. Alternatively or in addition, the element may also perform the function of a particle filter or a particle trap in order to reduce the concentration of particles in the exhaust-gas flow. This may be either a closed particle filter which includes a multiplicity of alternately closed-off channels or a so-called partial flow filter in which, through the use of fixtures, a part of the exhaust gas is conducted into a porous medium. Both the catalyst carrier body and also the particle filter may be constructed in particular in the form of a honeycomb body in which a ceramic and/or metallic body is formed with a multiplicity of cavities through which a flow can pass. A metallic honeycomb body may also have not only at least partially structured metallic foils but also layers of superfine wires (nonwoven).

The element has a first end side which faces counter to the exhaust-gas flow during the operation of the configuration, in such a way that the exhaust gas flows through the exhaust line and into the element through the first end side and is conducted through the element to the second end side of the element. The passage of the flow through the element results in particular in a homogenization of the exhaust-gas flow over the cross section of the exhaust line. The homogenization continues at least in a short region downstream of the element before the individual flows which were previously at least partially separated from one another, in particular in a honeycomb body, then merge again in the exhaust line. The laminar flow region, which occurs only in the direct vicinity of the second end side of the element on the outflow side of the element, permits a reproducible and adjustable distribution of the reactant being introduced. This is based on the fact that, in the laminar flow region, there is barely any turbulence of the exhaust-gas flow which could cause swirling of the reactant being introduced and thereby generate locally fluctuating relative speeds of the exhaust-gas flow. Outside the laminar flow region, the flow behavior of the reactant being supplied is influenced in a non-uniform and therefore unpredictable manner, and is deflected in an undefined way by the turbulence of the exhaust-gas flow.

For this reason, the adding unit is disposed at a distance of at most 30 mm, in particular at a distance of at most 20 mm and preferably at a distance of at most 15 mm from the second end side of the element. In this case, the distance is defined as the spacing of the adding unit or of the nozzle opening from the furthest remote point of the second end side of the element in the main flow direction.

Through the use of a special construction of the adding unit, which may for example have a permanently open nozzle or a controlled valve, the reactant is introduced into the exhaust line, wherein the nozzle may be adapted, in a manner specific to the present application, to the substantially constant flow conditions in such a way that desired uniform contact of the reactant with the element is obtained under the occurring operating conditions. In particular, it is also obtained in this way that no (significant) amount of the added reactant is sprayed past the second end side, and (virtually) the entire amount reaches the second end side. The fraction of impinging reactant is preferably greater than 90% or even greater than 96% of the dispensed amount, in particular under all operating conditions of the configuration in a motor vehicle.

In accordance with another feature of the invention, the second end side has a spherical shape, in particular a concavely spherical shape, in such a way that, through the use of the adding unit disposed opposite the spherical second end side, the reactant can be distributed uniformly over the surface of the second end side. In this case, the spherical construction of the second end side is aligned in particular toward the configuration of the adding unit.

In accordance with a further feature of the invention, the second end side is formed so as to be inclined with respect to the exhaust line, with the inclination being disposed relative to the adding unit in such a way that a uniform distribution of the supplied reactant can be attained over the area of the second end side. Such an inclination of the second end side of the element can be realized in a simple manner in production terms and is therefore preferably used.

In accordance with an added feature of the invention, the adding unit is disposed outside an exhaust line diameter, in particular in a partial region of the exhaust line which is not (directly) traversed by flow. The partial region may, for example, be formed as a conical housing which is disposed on the circumferential surface of the exhaust line, with the cone opening in the direction of the exhaust line, and with the adding unit being disposed at the other end of the cone. In particular, the adding unit may additionally be at least partially shielded from the exhaust-gas flow by a shield plate. Through the use of such a configuration of the adding unit outside the exhaust-gas flow, it is achieved firstly that the adding unit is not contaminated by particles present in the exhaust-gas flow and therefore also cannot become at least partially blocked, and secondly that a uniform shape of the spray cone of reactant in the partial region is made possible, and the spray cone is introduced into the laminar flow region of the exhaust-gas flow.

In accordance with an additional feature of the invention, the adding unit is disposed at an angle with respect to the exhaust line, in such a way that it is made possible for the reactant to be introduced counter to the exhaust-gas flow, and for at least a part of the supplied reactant to impinge on the second end side.

In accordance with yet another feature of the invention, a configuration is considered to be advantageous in which the element has, at the second end side, an absorption capacity for droplets of the reactant with a diameter of greater than 200 μm. Specifically when the reactant is added with a droplet diameter of greater than 200 μm [micrometers], the element for exhaust-gas purification should have a corresponding absorption capacity and/or storage capacity, such as for example a suitable porosity, locally close to the second end side. Consideration is thus given in particular to ceramic carrier bodies, a corresponding porous coating (washcoat) and/or a section with a metallic porous nonwoven. The absorption and/or storage capacity of an area with an extent similar to the droplet diameter is preferably twice the volume of the droplet. This teaching may also be advantageous independently of the configuration/method described herein.

With the objects of the invention in view, there is also provided a method for adding a reactant into an exhaust line during operation of an internal combustion engine. The method comprises providing an exhaust-gas purification element with an upstream first end side, a downstream second end side and a laminar flow region, in the exhaust line, providing an adding unit in the exhaust line downstream of the element in the laminar flow region, and dispensing or adding predetermined amounts of the reactant onto the second end side of the element with the adding unit.

In this case, the adding unit need not be disposed within the laminar flow region of the element, which is present only in the region of the exhaust line diameter and is disposed in alignment with the second end side of the element. In fact, the adding unit may also be positioned laterally offset with respect to the laminar flow region, in such a way that the spray cone of the adding unit is formed in particular in a partial region not (directly) traversed by flow, and then continues preferably exclusively in the laminar flow region of the element.

In accordance with another mode of the method of the invention, the reactant is sprayed onto a second end side of the element through the use of an asymmetrically shaped nozzle of the adding unit. An asymmetrically shaped nozzle produces a correspondingly asymmetrical spray cone in which regions of different reactant amounts are present in a plane perpendicular to the spray direction. In this way, it is achieved that, in particular when the adding unit is disposed outside the exhaust line diameter, different partial regions of the second end side can be supplied with an individually defined amount of reactant.

In accordance with a further mode of the method of the invention, the adding unit is disposed outside the exhaust line diameter and acts on at least 90% of an area of the second end side. The adding unit is thus disposed relative to the second end side in such a way that preferably the entire area of the second end side is impinged on by the reactant. In this case, the area of the second end side is defined as the (if appropriate curved) plane spanned by the end points of the structure of the element.

In accordance with an added mode of the method of the invention, the second end surface of the element is impinged on with reactant with uniform area loading. This means in particular that every partial region of the second end side of the element disposed within the spray cone of the adding unit is impinged on with the same amount of reactant. This advantageous distribution of the reactant leads to a uniform conversion of the reactant in the exhaust-gas flow, in such a way that optimum purification of the exhaust-gas flow is attained.

In accordance with an additional mode of the method of the invention, at least 90% of the added reactant makes contact with the surface of the second end side of the element. The surface of the element is defined both as the area of the second end side of the element and also surfaces within the element itself. By virtue of at least 90% of the added reactant making contact with the surface of the second end side of the element, as fine as possible a distribution of the reactant is obtained in the exhaust-gas flow, and the evaporation of the reactant is therefore improved.

In accordance with yet another mode of the method of the invention, the size of the droplets of the reactant added into the exhaust line is variable. This means in particular that the nozzle of the adding unit can produce droplets of different size in particular as a function of exhaust-gas speed and reactant supply speed. Furthermore, through the use of an asymmetrically constructed nozzle of the adding unit, the size of the droplets within the spray cone may be made different, in such a way that the reactant can be deposited on the second end side of the element with the most uniform possible surface loading as a function of flow conditions of the exhaust-gas flow. In particular, those droplets in the region of the spray cone of the adding unit which are directed to the further remote regions of the second end side of the element should be larger than the droplets which must cover only a short distance from the adding unit to the second end side.

The droplet size should be selected in particular as a function of exhaust-gas speed, angle of the adding unit and speed of the supplied reactant. It is preferable for droplets to be generated (also/only) with a diameter of greater than 200 μm [micrometers]. Such droplets can reach even remote regions of the second end side of the element at exhaust-gas speeds of approximately 20 to 25 m/s. The method may also be realized independently of the above embodiment of the configuration and/or of the method. Smaller droplets may otherwise also be used.

In accordance with yet a further mode of the method of the invention, the ratio of largest droplets to smallest droplets is at least 3 to 1. The smallest droplets generated are supplied preferably to those regions of the second end side which are disposed at only a small spacing from the adding unit, while the largest droplets, in particular those with droplet diameters of at least 200 μm [micrometers], are supplied to the remote regions of the second end side.

In accordance with yet an added mode of the method of the invention, the speed of the droplets of the reactant added into the exhaust line is variable. In this case, too, the speed of the droplets which impinge on those regions of the second end side of the element which are remote from the adding unit should have higher droplet speeds. In particular, the adaptation of the parameters droplet size and droplet speed should be coordinated with one another and if appropriate combined.

In accordance with yet an additional mode of the method of the invention, the ratio of highest speed to lowest speed of the droplets is at least 3 to 1.

In accordance with a concomitant mode of the method of the invention, it may also advantageously be provided that the adding of the reactant is controlled through the use of an adding pressure applied to the adding unit. It is consequently possible for the pressure in the feed line of the reactant to be adapted (without the need to vary the (different) settings for the nozzle). For this purpose, it is possible for example for a pump to set a delivery pressure, for a pressure control valve to set the suitable desired adding pressure in the feed line, and for a valve to dispense the desired amount (droplets, speed) into the exhaust line. The method may also be realized independently of the above embodiment of the configuration and/or of the method.

The configuration according to the invention and/or the method according to the invention are provided in particular for use in a motor vehicle and may if appropriate be combined with one another.

The configuration and the method preferably serve for the adding of liquid urea-water solution, with the element having a hydrolysis coating at least on one section of the second end side.

Other features which are considered as characteristic for the invention are set forth in the appended claims, noting that the features and steps specified in the dependent claims may be combined with one another in any desired technologically meaningful way and define further embodiments of the invention.

Although the invention is illustrated and described herein as embodied in an exhaust gas purification configuration and a method for exhaust gas purification using a reactant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
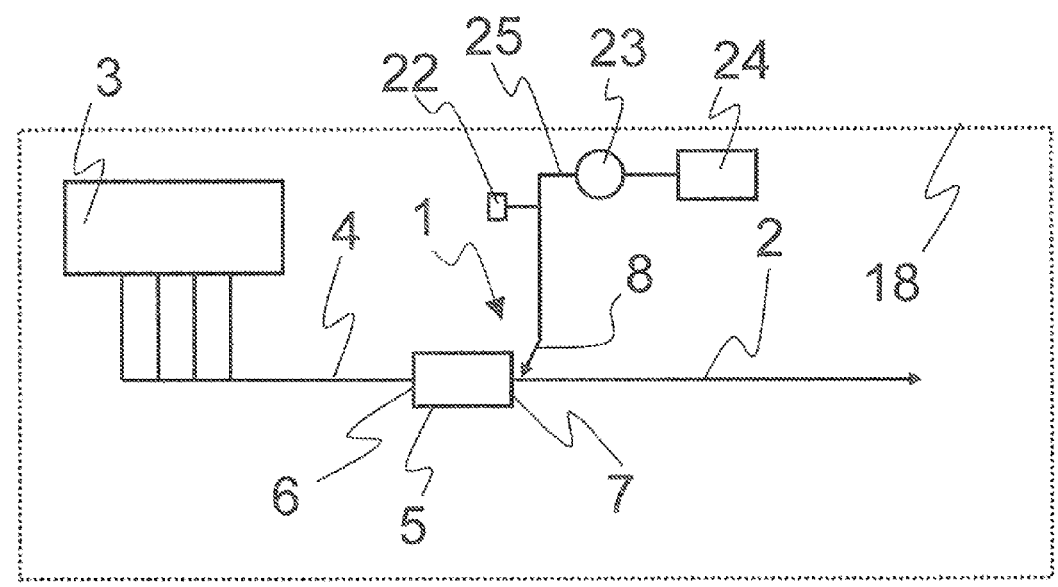
FIG. 1 is a diagrammatic, plan view of a motor vehicle having a configuration according to the invention.

Referring now in detail to the figures of the drawing, in which the same reference numerals are used for identical objects for explaining the invention and the technical field in more detail by showing particularly preferred structural variants to which the invention is not restricted, and first, particularly, to FIG. 1 thereof, there is seen a configuration 1 in a motor vehicle 18 having an internal combustion engine 3 and an exhaust line 4, through which an exhaust-gas flow 2 flows. In this case, an element 5, which is disposed in the exhaust line 4, has an upstream first end side 6 and a downstream second end side 7. An adding unit 8 is also disposed downstream of the element 5. The adding unit 8 is connected through a feed line 25 to a pump 23 and to a tank 24. Furthermore, a pressure control valve 22 may also be connected to the feed line 25, in such a way that a delivery pressure which is provided in the feed line 25 by the pump 23 can, if appropriate, be reduced to an adding pressure by the pressure control valve 22. A reactant is then introduced into the exhaust line 4 at the adding pressure from the feed line 25. For this purpose, the adding unit 8 is provided with a controlled valve, through the use of which the desired amount of reducing agent is conveyed into the exhaust line 4 at the desired time.

Figure 2:
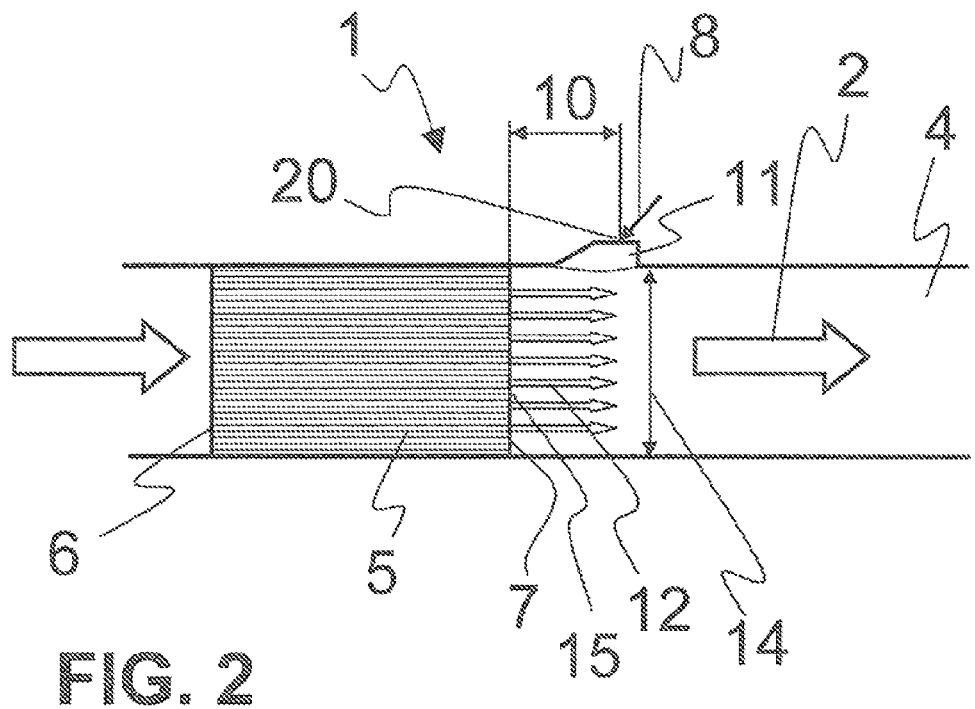
FIG. 2 is an enlarged, sectional view of a first embodiment of the configuration.

FIG. 2 shows a configuration 1 having an element 5 disposed in an exhaust line 4. An exhaust-gas flow 2 passes through a first end side 6 in the direction of a second end side 7, of the element 5. The second end side 7 has an area 15 which corresponds substantially to the cross-sectional area of the exhaust line 4. A laminar flow region 12, which is produced downstream of the element 5, extends up to a distance 10 from the second end side 7 of the element 5. A reproducible introduction of reactant is possible, within the laminar flow region 12, which is always present during the operation of the configuration 1, in such a way that uniform area loading of the surface 15 with reactant can be attained. The adding unit 8 for the reactant is disposed at only the short distance 10 from the second end side 7, in such a way that, in particular, the entire amount of reactant passes through the laminar flow region 12 to the second end side 7 of the element 5. In this case, the adding unit 8 is provided with a nozzle 20 within a partial region 11 of the exhaust line 4 which is situated outside the diameter 14 of the exhaust line and which, in particular, is not traversed by the exhaust-gas flow 2. The partial region 11 is situated in such a way that firstly the adding unit 8 is not contaminated with or damaged by particles contained in the exhaust-gas flow 2, and secondly a spray cone can be formed in a reproducible and determinable manner.

Figure 3:
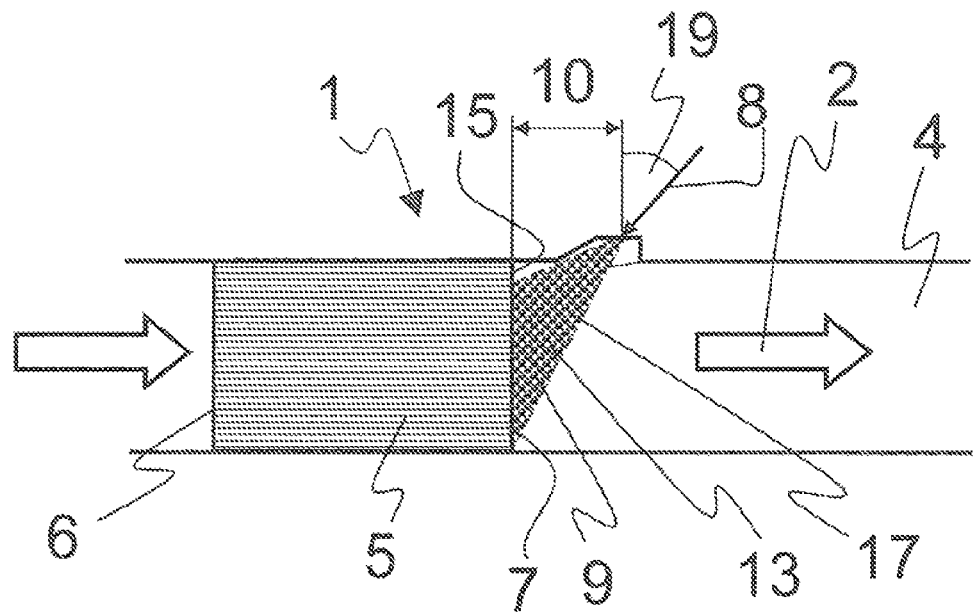
FIG. 3 is a sectional view of the first embodiment of the configuration at a moment at which a reactant is introduced.

FIG. 3 shows an element 5 in the exhaust line 4, with the exhaust-gas flow 2 flowing through the element 5 of the configuration 1 through a first end side 6 to a second end side 7. An adding unit 8, which is disposed downstream of the element 5, sprays a spray cone 13 of a reactant 9 into the exhaust line 4. The spray cone 13 covers the area 15 of the element 5 as completely as possible. In this case, droplets 17 are formed within the spray cone 13. The droplets 17 are adapted in terms of their size and speed as a function at least of the exhaust-gas speed, a spacing of wall regions of the second end side 7 from the adding unit 8, and an angle 19 of the adding unit 8.

Figure 4:
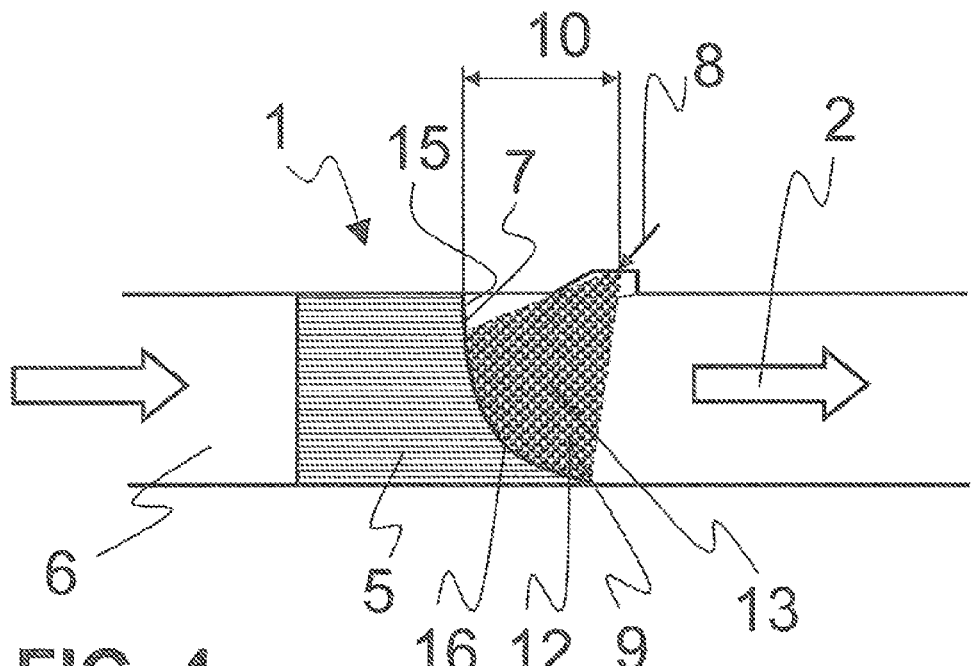
FIG. 4 is a sectional view of a second embodiment of a configuration according to the invention, having a spherical second end side.

FIG. 4 shows a configuration 1 having the element 5 with a first end side 6 and a second end side 7. The second end side 7 has a spherical construction in relation to the adding unit 8, so as to permit as constant as possible an area loading of the second end side 7 with the reactant 9. The spray cone 13 of the adding unit 8 then merely needs to be adapted asymmetrically so as to attain as uniform as possible a surface loading of the second end side 7 of the element 5. In this case, the reactant 9 not only impinges on the outermost boundary of the second end side 7 but also makes contact at least partially with surfaces 16 of the element 5, in such a way that the surface 16 wetted by the reactant 9 is larger than the end-side area 15 of the second end side 7. The distance 10 is defined as the spacing between the adding unit 8 and the second end side 7, with the distance 10 being measured in the main flow direction of the exhaust-gas flow 2 in the laminar flow region 12.

Figure 5:
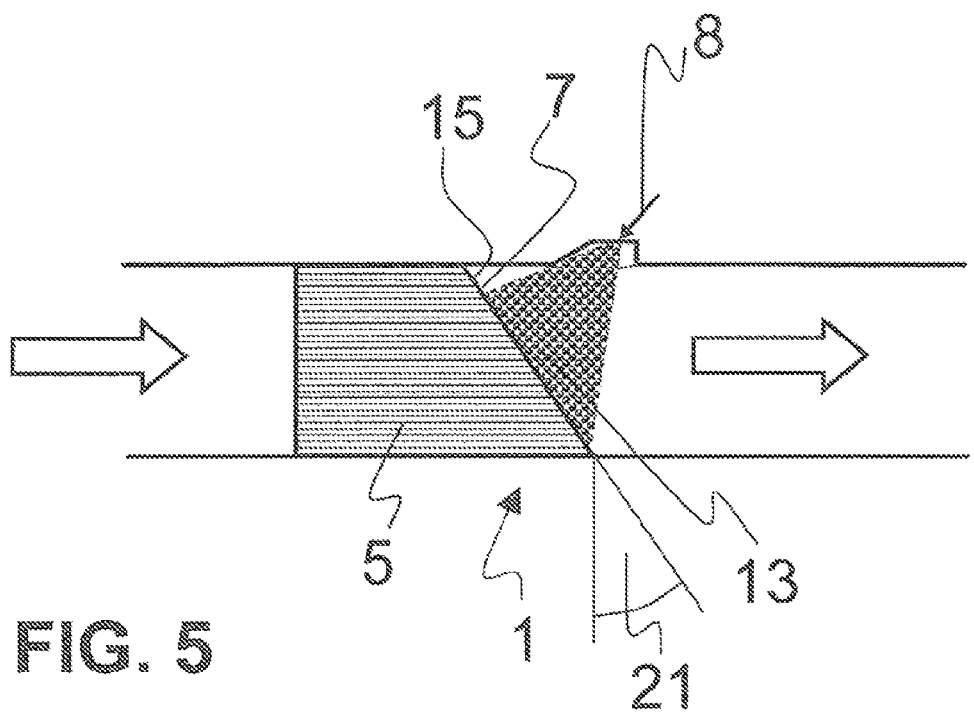
FIG. 5 is a sectional view of a third embodiment of a configuration according to the invention, with an inclined second end side.

FIG. 5 shows a further particularly advantageous embodiment of the configuration 1, with the element 5 having a second end side 7 which is inclined by an angle of inclination 21 and through the use of which as constant as possible an area loading of the area 15 of the element 5 can be attained with a spray cone 13 of an adding unit 8.

The invention claimed is:

1. A configuration for the purification of an exhaust-gas flow of an internal combustion engine, the configuration comprising:
    an exhaust line communicating with the internal combustion engine and having a cross section;
    an exhaust-gas purification element disposed in said exhaust line and having a first end side and a second end side, said element configured to conduct an exhaust-gas flow through said element from said first end side to said second end side, said element configured to attain a homogenization of the exhaust-gas flow over said cross section of said exhaust line and said homogenization continuing in a region downstream of said element as a laminar flow region; and
    an adding unit disposed downstream of said element for adding a reactant into the exhaust-gas flow, said adding unit being spaced apart from said second end side of said element by a distance of at most 30 mm, said adding unit being disposed in said laminar flow region and said adding unit being configured to cause at least 90 percent of the added reactant to impinge on said second end side of said element.

2. The configuration according to claim 1, wherein said second end side has a spherical shape.

3. The configuration according to claim 1, wherein said exhaust line has an exhaust line diameter, and said adding unit is disposed outside said exhaust line diameter.

4. The configuration according to claim 1, wherein said element has an absorption capacity for droplets of the reactant at said second end side, with a diameter of greater than 200 µm.

5. A method for adding a reactant into an exhaust line during operation of an internal combustion engine, the method comprising the following steps:
    providing an exhaust-gas purification element in the exhaust line;
    providing the element with an upstream first end side and a downstream second end side;
    attaining a homogenization of an exhaust-gas flow over a cross section of the exhaust line;
    continuing the homogenization in a region downstream of the element as a laminar flow region;
    providing an adding unit in the exhaust line at most 30 mm downstream of the second end side of the element and in the laminar flow region; and
    dispensing predetermined amounts of the reactant onto the second end side of the element with the adding unit and contacting a surface of the second end side of the element with at least 90% of the dispensed reactant.

6. The method according to claim 5, which further comprises spraying the reactant onto the second end side of the element with an asymmetrically shaped nozzle of the adding unit.

7. The method according to claim 5, which further comprises defining an exhaust line diameter of the exhaust line, defining an area of the second end side of the element, placing the adding unit outside the exhaust line diameter, and impinging upon at least 90% of the area of the second end side with the reactant.

8. The method according to claim 5, which further comprises impinging upon the second end side of the element with the reactant with uniform area loading.

9. The method according to claim 5, which further comprises controlling the dispensing of the reactant by using an adding pressure applied to the adding unit.

10. The method according to claim 5, which further comprises carrying out the dispensing step with variable-size droplets of the reactant dispensed into the exhaust line.

11. The method according to claim 10, which further comprises a ratio of largest droplets to smallest droplets of at least 3 to 1.

12. The method according to claim 5, which further comprises varying a speed of droplets of the reactant dispensed into the exhaust line.

13. The method according to claim 12, which further comprises a ratio of highest speed to lowest speed of the droplets of at least 3 to 1.

* * * * *